United States Patent [19]
Kanai

[11] Patent Number: 5,353,048
[45] Date of Patent: Oct. 4, 1994

[54] IMAGE RECORDING APPARATUS

[75] Inventor: Makoto Kanai, Saitama, Japan

[73] Assignee: Fuji Xerox Co., Ltd., Tokyo, Japan

[21] Appl. No.: 873,755

[22] Filed: Apr. 27, 1992

[30] Foreign Application Priority Data

Apr. 30, 1991 [JP] Japan .................. 3-126806

[51] Int. Cl.⁵ .............................. H04N 1/21
[52] U.S. Cl. ............................. 346/108; 358/298
[58] Field of Search ............. 346/108, 1.1, 76 L, 346/107 R, 160; 358/296, 298, 300, 302

[56] References Cited
U.S. PATENT DOCUMENTS 4,307,408 12/1981 Kiyohara et al. ............... 346/108

FOREIGN PATENT DOCUMENTS 59-146017 8/1984 Japan .

Primary Examiner—Mark J. Reinhart
Attorney, Agent, or Firm—Finnegan, Henderson, Farabow, Garrett & Dunner

[57] ABSTRACT

An image recording apparatus such as a laser printer in which a beam from a laser source is deflected by a deflector such as a rotating polygon mirror and a surface to be scanned is scanned by such deflected beam. The image recording apparatus includes a light source for outputting a beam, a deflection unit for deflecting the beam in predetermined directions to scan a scanning surface, a beam detection unit for receiving the beam deflected by the deflection unit to set a reference timing every scanning operation, and a beam intensity switching unit for controlling the light source to switch an intensity of the beam by a plurality of degrees.

6 Claims, 4 Drawing Sheets

IMAGE RECORDING APPARATUS

BACKGROUND OF THE INVENTION

The invention relates to an image recording apparatus such as a laser printer in which a beam from a laser source is deflected by a deflector such as a rotating polygon mirror and a surface to be scanned is scanned by such deflected beam. More particularly, the invention is directed to an apparatus in which the beam intensity can be varied in accordance with the scanning density or the like.

A conventional apparatus for writing an image by scanning a surface to be scanned such as a photoreceptor drum using a beam applied from a laser source includes: a printer called a laser beam printer and a digital electronic copying machine. For example, a laser beam printer 1 such as shown in FIG. 4 is used as a typical example of the above-mentioned image forming apparatus. In the laser beam printer 1 shown in FIG. 4, a laser scanner 2 is used as an image writing unit. This laser scanner 2, using a laser beam output member 3 that outputs a laser beam while modulating it in accordance with an image signal, causes the laser beam outputted from the laser beam output member 3 to be irradiated to a polygon mirror 4. Then, the laser beam deflected in accordance with the rotation of the polygon mirror 4 is caused to pass through an fθ lens 5 and to change its advancing direction through mirrors 6 and 7, and is outputted to a photoreceptor drum 10. Below the laser scanner 2, the photoreceptor drum 10 that rotates at a predetermined speed is provided, and the laser beam outputted from the laser scanner 2 is used to scan the photoreceptor drum 10 at an exposing position 12 in the width direction of the drum (main scanning direction) repetitively. Upstream to the exposing position of the photoreceptor drum 10 is a charger 11, while downstream from the exposing position is a developing unit 13. The charger 11 charges the surface of the photoreceptor drum 10 uniformly, and a latent electrostatic image is formed with the irradiation of the laser beam from the laser scanner 2 at the exposing position. Toner is supplied from the developing unit 13 onto the latent electrostatic image to form a toner image, and the toner image is transferred onto a sheet with discharging operation by a transfer corotron 24. The charger 11 and the transfer corotron 24 are formed of a single-strand corotron wire stretched over a shielded space with a voltage applying terminal being provided on one end of the wire.

The toner or the like remaining on the surface of the photoreceptor drum 10 after the toner image has been transferred onto the sheet from the drum 10 in such a manner as described above is wiped away by a blade 17 of a cleaner 16, and then the drum 10 is charged again by the charger 11 so that a next image can be formed. The toner or the like wiped by the blade 17 is forwarded to a toner recovery hopper by a forwarding unit 18 such as an auger or the like disposed inside the cleaner 16. Further, the developing unit 13 is provided with a toner container section having a stirring means 14 and a developing roller 15, so that the surface of the developing roller 15 with the toner adhering thereon is rotated toward the latent electrostatic image over a portion corresponding to the photoreceptor drum 10. Further, the developing bias is applied to the developing roller 15 by a not shown power supply means.

The sheet on which the toner image formed on the photoreceptor drum is transferred is supplied from a sheet feed cassette 20 accommodated in the lower portion of the apparatus. As the sheet feed cassette 20, a cassette having a structure similar to that of an ordinarily used tray may be employed. The sheet contained in the sheet feed cassette 20 is forwarded by a sheet feed roller 21 which is a semicircular roller and further forwarded by a forward roller unit 22 disposed in a sheet forward path. On the portion immediately before the image transfer position in the sheet forward path, a registration roller unit 23 is provided. The roller unit 23 temporarily stops the sheet with the front end of the sheet nipped and is driven in synchronism with the timing of the toner image formed on the photoreceptor drum. The toner image on the photoreceptor drum is then transferred onto the sheet by discharging operation of the transfer corotron 24.

The sheet on which the toner image has been transferred is guided into a fuser 25, and when passing between a heat roller 26 and a pressure roller 27 provided at the fuser 25, the sheet is subjected to heat and pressure to fuse the toner and fix the toner thereon, thus producing a copy. The copy discharged from the fuser 25 is forwarded either into a discharge tray that is arranged on the side or into an upper discharge tray 34 by selecting a path with a switching member 31 disposed on a discharge path 30. Discharge rollers 32 and 33 are provided so as to correspond to the above-mentioned two discharge trays, the discharge tray on the side discharging copies with the sheets faceup, while the upper discharge tray 34 discharging the copies with the sheets facedown with pagination.

The thus constructed laser beam printer 1 has a control circuit such as shown in FIG. 5. The laser beam printer 1 shown in FIG. 4 includes a controller 40 mounting a central processing unit (CPU), the control of the controller 40 is effected in accordance with a program stored in a built-in read only memory. Various circuit components are connected to the controller 40 shown in FIG. 5. For example, sensors 41 for sensing sheet forward conditions, a drive unit 45 such as a main motor for driving mechanical components of various units, control means 42 such as various clutches and solenoids that control the drive force transmitted from the drive unit 45, and the like.

Further, with respect to the discharging unit such as the charger and the transfer corotron, a high-voltage power generator 44, a power supply control means for the fuser 25, a control means for the laser scanner 2, and the like are also connected to the controller 40. The controller 40 is connected to a not shown image information processor such as a computer using a cable 47 having a connector 46 disposed on the end portion thereof so that both units can be intercommunicated. The controller 40 receives its drive power from a low-voltage power supply 43, which converts 100-V commercial power supply to voltage levels required by the various units.

In the conventional laser beam printer 1, a unit for writing an image onto the photoreceptor drum using the laser scanner is constructed as shown in FIG. 6. In the example shown in FIG. 6, a laser beam Rb outputted from a laser oscillator 51 is modulated into a dot pattern to be recorded at a modulator 52 based on a signal applied from the recording control section 50. The modulated laser beam Rb is deflected toward the photoreceptor drum 10 by the polygon mirror 4 rotating at a high speed, and scans positions a, b and c shown in FIG. 6 in that order. Further, at the scanning start point is a beam detector 53 such as a PIN diode that outputs an electric signal upon reception of a beam so that a laser beam whose optical path has been bent by a reflecting mirror 54 can be detected.

When the beam detector 53 detects a beam, it outputs a detection signal, and modulation of the laser beam Rb is started in accordance with information to be recorded with a signal generating timing occurring every scanning operation as a reference. That is, the above detection signal is used as a horizontal synchronizing signal (main scanning direction). As shown in FIG. 7, based on the signal outputted at the scanning start point a, scanning is effected on the photoreceptor drum from the writing start point b to the writing end point c to thereby form a latent electrostatic image on the photoreceptor drum.

By the way, while the conventional laser beam printer is operated at a single scanning density, recent arts featured by combining a plurality of office machines and equipments as well as developments in information processing systems have led to come into being, e.g., a system combining an image reader for reading data at 400 dpi (dots/inch) and a text editor for handling 300 dpi font data together. Consequently, as a printer accommodating such a system, a laser beam printer having a plurality of scanning densities has been called for. In such a laser beam printer, a technique for switching the beam intensity in accordance with the scanning density may be employed to optimize each of images having different scanning densities. Further, in the laser beam printer, there is a tendency to use higher scanning densities; the density range of 240 to 300 dip in early versions of constant speed laser beam printers is increased to that of 300 to 400 dpi in current mainstay printers. A recent laser beam printer has a density of as many as 600 dpi. The laser beam printers having higher scanning densities are generally designed to reduce not only the beam diameter but also the beam intensity to obtain beams narrower than the conventional beams. Thus, as the scanning density is increased, the beam intensity is reduced.

On the other hand, there is a tendency that the sensitivity of the photoreceptor drum is improved, so that less light is required for forming an image on the photoreceptor drum. It is apparent from these considerations that the beam intensity required for scanning the photoreceptor drum surface is reduced to a considerably low degree compared with that in the conventional case. That is, irradiation of a beam whose intensity is more than required to form a latent electrostatic image on the photoreceptor drum may not only impair the printing quality but also deteriorate the performance of the photoreceptor drum itself. However, if the output of the laser beam is decreased to a level required by the photoreceptor drum, the output level of the beam detector for obtaining the horizontal synchronizing signal is reduced or a like problem is additionally addressed.

To overcome the above problems, a means shown, e.g., in Japanese Patent Unexamined Publication No. Sho. 59-146017 has been proposed. In the scanner of the above system, an ND filter is arranged at a position toward the photoreceptor drum so that the beam irradiated to the beam detector becomes more intense than that irradiated to the photoreceptor drum. That is, the beam intensity to be irradiated onto the photoreceptor drum can be lessened. However, in the case where the filter shown in the conventional system is provided, the scanner can meet the need for increasing the scanning density, but cannot be applied to an apparatus having a plurality of scanning densities. Further, as disclosed in the above-mentioned publication, to obtain an adequate response with a small quantity of light when a horizontal synchronizing signal is generated, the sensitivity of the beam detector must be improved to a significant degree. However, when the sensitivity of the beam detector is improved, the beam detector is subjected to noise such as electrostatic noise and power supply noise, and any disturbance of the image signal may often result in abnormal output images and defective operations of the units. To overcome the above problems, it is necessary to provide a proper quantity of light to both the beam detector from which a timing reference signal is obtained and a light-receiving means of the photoreceptor drum.

SUMMARY OF THE INVENTION

The invention has been made to overcome the above problems associated with the conventional scanner. Accordingly, an object of the invention is to provide an image recording apparatus capable not only of accommodating an apparatus having a different scanning density but also of providing appropriate quantities of light to both the beam detector and the photoreceptor drum.

In order to accomplish the above object, the invention provides an image recording apparatus comprising a light source for outputting a beam, deflection means for deflecting the beam in predetermined directions to scan a scanning surface, beam detection means for receiving the beam deflected by the deflection means to set a reference timing every scanning operation, and beam intensity switching means for controlling the light source to switch an intensity of the beam by a plurality of degrees.

DETAILED DESCRIPTION OF THE PREFERRED EMBODIMENTS

Figure 1:
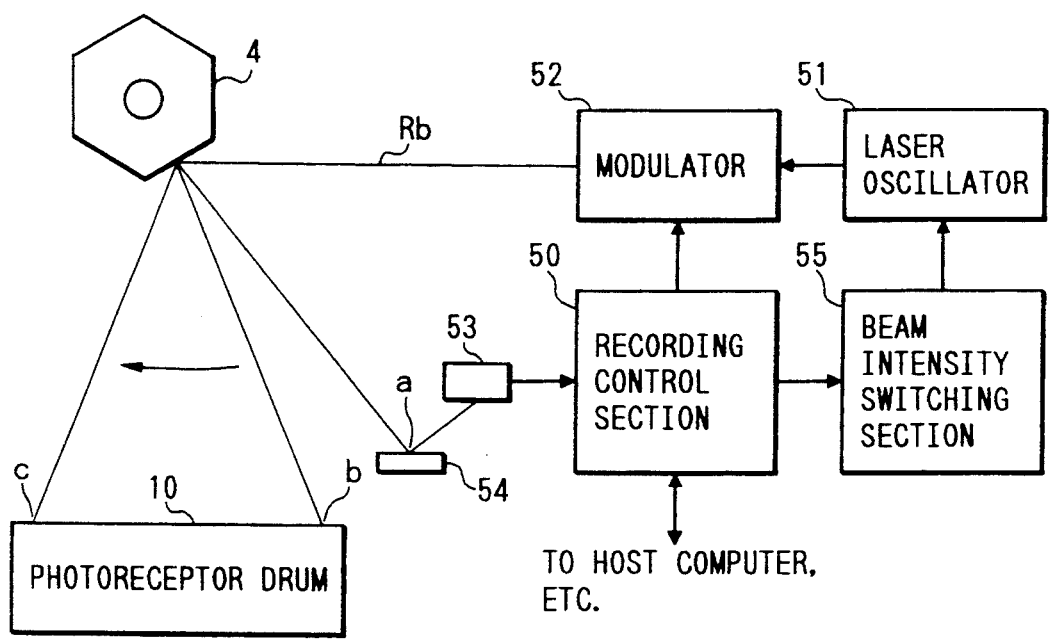
FIG. 1 is a block diagram showing a control circuit of a laser scanner of the invention.
Figure 6:
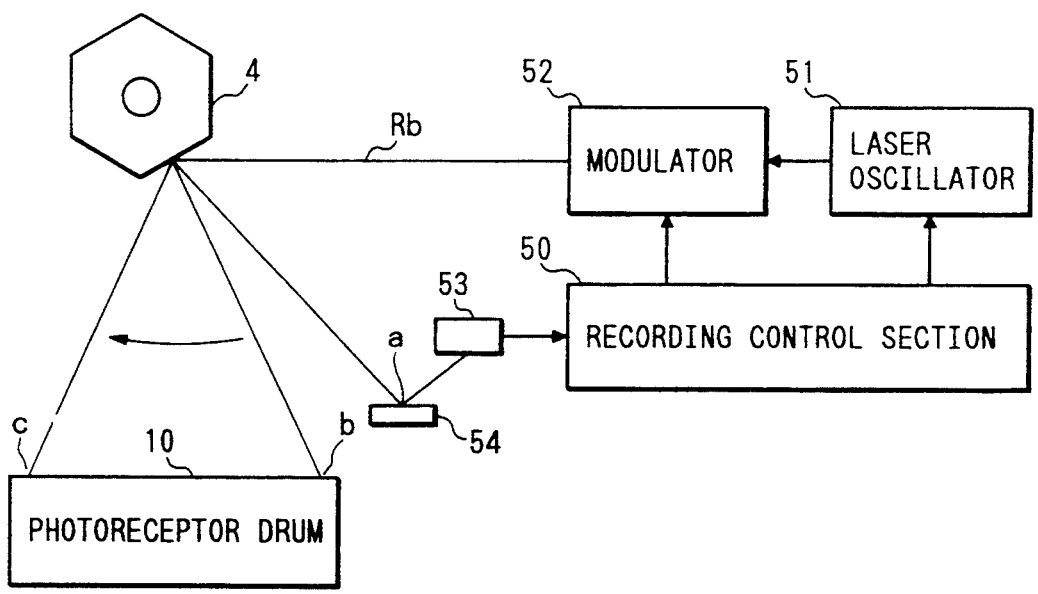
FIG. 6 is a block diagram showing a control circuit of a conventional laser scanner.

An image recording apparatus of the invention will be described with reference to examples shown in the drawings. FIG. 1 schematically shows a control mechanism of a laser beam printer of the invention, the control mechanism involving a unit for writing an image onto a photoreceptor drum 10 using a laser scanner. While a controller shown in FIG. 1 is constructed in a manner similar to that shown in FIG. 6, the former differs from the latter in that a beam intensity switching section 55 is additionally provided. The controller shown in FIG. 1 is designed so that a laser beam Rb supplied from a laser oscillator 51 is outputted with its intensity varied in accordance with an image intensity signal applied from the beam intensity switching section 55 to the laser oscillator 51. The laser beam Rb outputted from the laser oscillator 51 is outputted while modulated into a dot pattern to be recorded through a modulator 52. The modulated laser beam Rb is then deflected by a polygon mirror 4 rotating at a high speed toward the photoreceptor drum 10 and scans the drum at positions a, b and c in the written order. A beam detector 53 such as a PIN diode that generates an electric signal upon reception of a beam is arranged at the scanning start point, so that the detector 53 can detect a laser beam whose optical path has been bent by a reflecting mirror 54.

Figure 2:
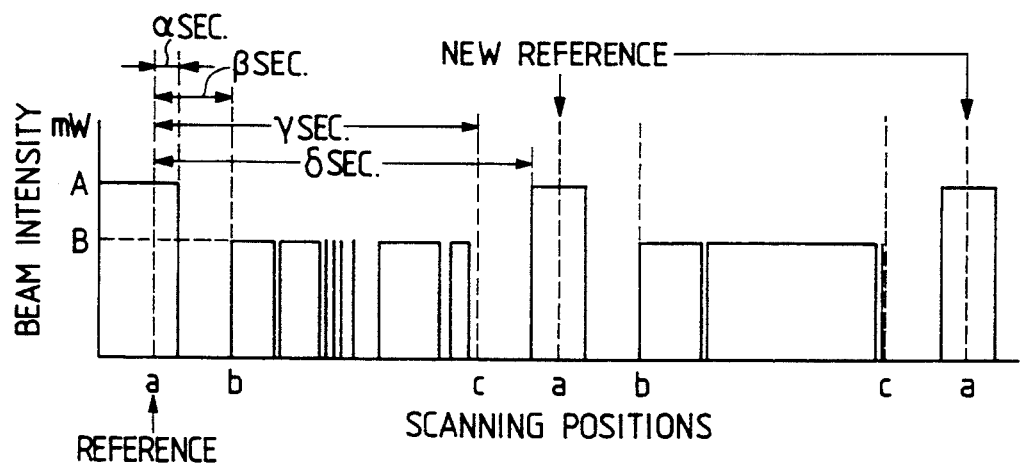
FIG. 2 is a graph showing a state of a laser beam outputted from the laser scanner of the invention.

When the beam detector 53 has detected the beam, it outputs a detection signal, and output of a laser beam Rb having such an intensity as to match recording image information is started with the timing at which this detection signal is generated every scanning as a reference. The detection signal obtained by the beam detector 53 is used as a horizontal synchronizing signal (main scanning direction). As shown in FIG. 2, the photoreceptor drum is scanned by the beam from the writing start point b to the writing end point c based on the signal outputted at the scanning start point a to thereby form a latent electrostatic image on the photoreceptor drum.

The operation of writing an image with the thus constructed laser scanner of the invention will be described with reference to FIGS. 1 and 2. Upon input of a laser scanning activation signal to a recording control section 50, the laser scanner starts its operation of driving the polygon mirror 4. The recording control section 50 then informs to an image information output unit such as a host computer that the number of revolutions of the polygon mirror 4 has reached a predetermined value and that the recording control section 50 is ready to start writing the image, and prompts for an image signal from the image information output unit or the like. Upon application of a writing data signal from the image information output unit to the recording control section 50, the recording control section 50 sends a laser oscillation command to the laser oscillator 51 via the beam intensity switching section 55. A first beam is outputted by the signal from the recording control section 50 while set to an intensity of A mW that is suitable to the beam detector 53.

The laser beam outputted from the laser oscillator 51 is passed through the modulator 52, bent by the polygon mirror 4, reflected by the reflecting mirror 54 following an optical path a, and detected by the beam detector 53. The beam detector 53 applies, after detecting the laser beam, a detection signal to the recording control section 50. The recording control section 50 stops the laser oscillation after a predetermined time interval of $\alpha$ seconds elapses (the laser beam has moved only by a small distance from the optical path a at this timing; it has not reached the writing start point b yet) from a reference timing at which the signal from the beam detector 53 has been received. Further, when a time interval of $\beta$ seconds has elapsed from the reference timing, since the reflecting surface of the polygon mirror has reached a position at which the laser beam is reflected toward the writing start point b, the recording control section 50 supplies an image signal oscillation command to the laser oscillator 51 and o outputs a data signal to the modulator 52. At the time of writing the image, the beam intensity switching section 55 sets the beam density to a value, B mW, which is suitable to the photoreceptor drum 10.

The laser beam is irradiated until $\gamma$ seconds elapse from the reference timing, and the photoreceptor drum 10 is scanned from the writing start point b to the writing end point c to write a line on the photoreceptor drum 10. Then, the recording control section 50 stops the laser oscillation, and starts scanning a next line. After $\delta$ seconds have elapsed from the previous reference timing, the recording control section 50 applies a writing signal for the next line and outputs a scanning activation signal at an intensity of A mW in a manner similar for the first line. Then, as $\beta$ seconds have elapsed from a reference timing, the recording control section 50 sets a beam intensity of B mW suitable to the photoreceptor drum 10 to the laser oscillator 51 and supplies an image signal oscillation command to cause the laser oscillator 51 to irradiate the laser beam until $\gamma$ seconds elapse from the reference timing. These operations of writing the image are repeated cyclically.

Figure 7:
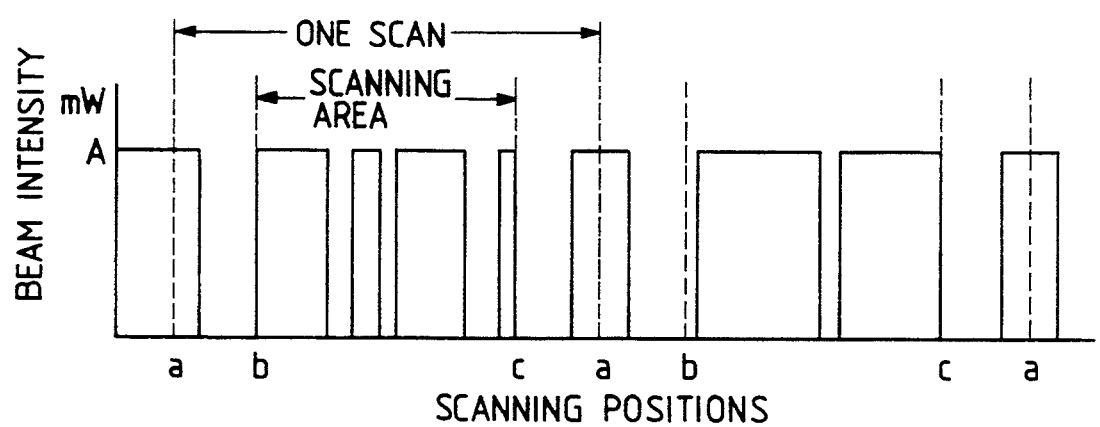
FIG. 7 is a graph showing a state of a laser beam outputted from the conventional laser scanner.

The graph shown in FIG. 2 indicates a scanning time of the scanner shown in FIG. 1 on the horizontal axis and a beam intensity on the vertical axis. As shown in the graph, the beam intensity of A mW for setting the scanning start point is usually selected to a value larger than the beam intensity of B mW for writing the image. However, depending on the properties of the beam detector and of the photoreceptor drum, such a setting as A=B or A<B may also be acceptable. If the beam intensities are set so that A=B, the control system becomes apparently the same as the conventional one shown in FIG. 7. However, in the invention, such a setting as A=B may be set only when the properties of the laser beam printer and of the photoreceptor drum can produce a satisfactory image.

Figure 3:
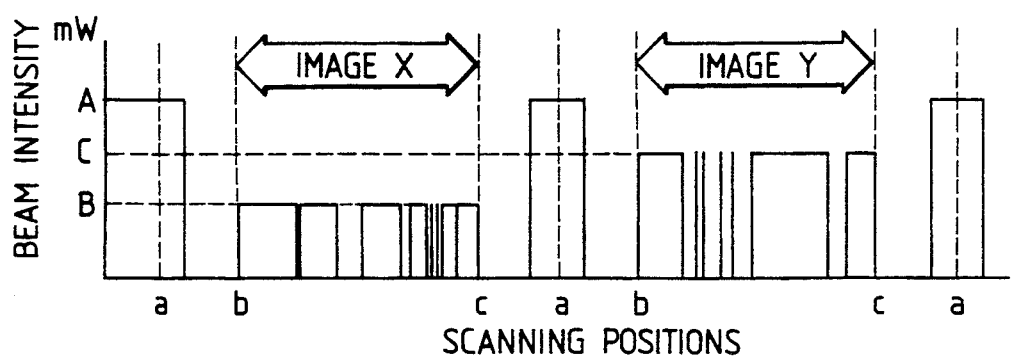
FIG. 3 is a graph showing intensities of outputted beams in the case where the laser beam outputted from the laser scanner of the invention has a plurality of scanning densities.

Further, if the image information output unit having a plurality of scanning densities is connected to the laser beam printer, the printer is designed so that different beam intensities are set and outputted for an image X and an image Y as shown in FIG. 3. That is, the beam intensity for setting the scanning start point is set to A mW so that the beam detector can make a correct detection, and when writing an image onto the photoreceptor drum, image signals are outputted so that the image X is written at the intensity of B mW and the image Y is written at the intensity of C mW depending on the scanning density of the image information output unit. Therefore, laser beams outputted from the laser oscillator are adjusted to have intensities corresponding to image densities, and images are written with such adjusted laser beams in the manner described above, so that latent electrostatic images formed on the photoreceptor drum can be expressed as having a single density.

Figure 4:
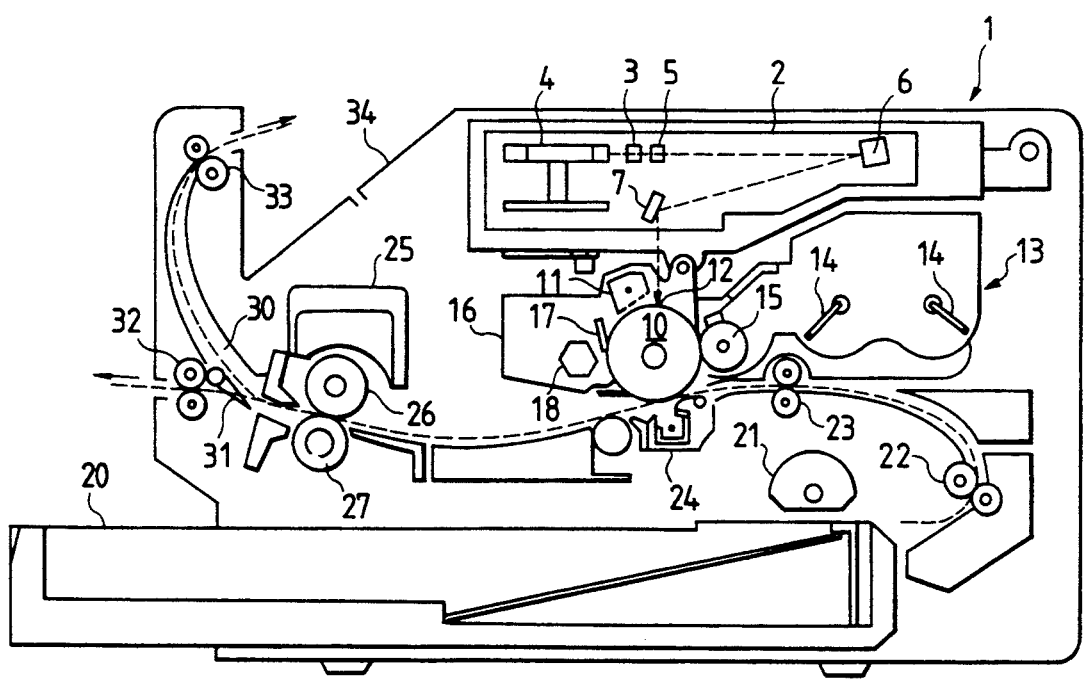
FIG. 4 is a diagram illustrative of a construction of an ordinary laser beam printer.
Figure 5:
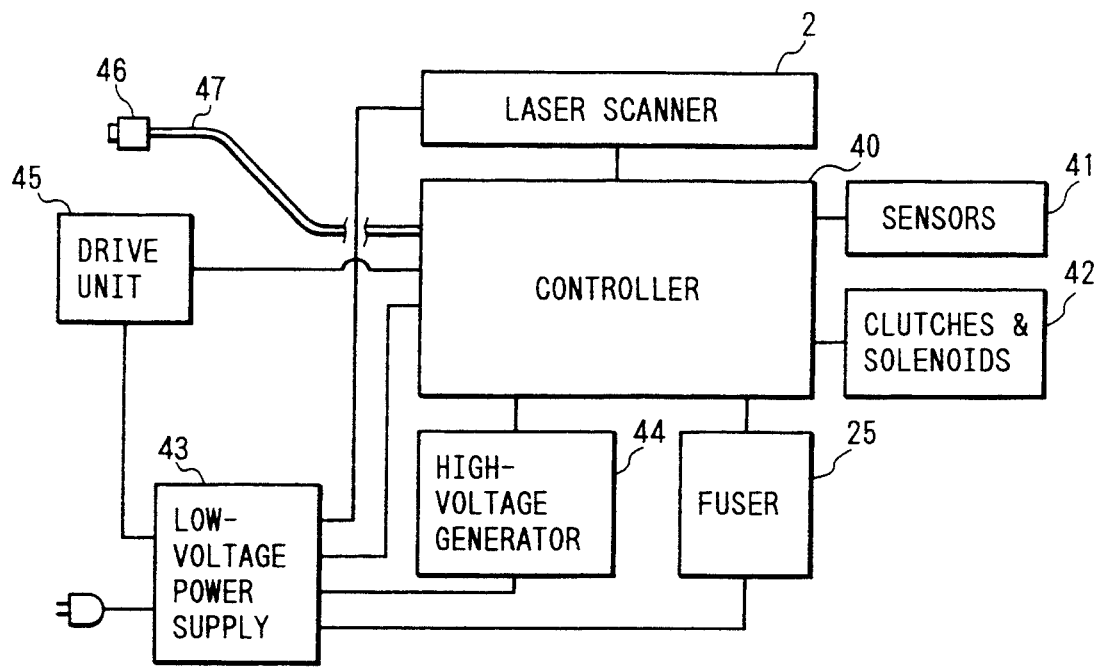
FIG. 5 is a block diagram showing a control circuit of a conventional laser beam printer.

The above embodiment of the invention refers to a scanning system involving a drop of potential at the image section of a laser beam printer; i.e., it refers to a so-called image writing system. In contrast thereto, the apparatus as the embodiment of the invention is also acceptably applicable to a scanning system involving the drop of potential at sections other than the above section, i.e., a background writing system if the timings of various controls or the sequence are changed. Further, the control system employed in the laser scanner of the invention can be applied to arbitrary image forming apparatuses that produce copies by using a laser beam, in addition to the laser beam printer shown in FIG. 4, and these laser beam printers can be connected to the image information output unit having an arbitrary image scanning density.

As described in the foregoing pages, the image recording apparatus of the invention arranges the beam intensity switching section permitting the beam intensity to be switched by a plurality of degrees between its control section and beam generating section, thereby allowing beams whose intensities are optimal to the beam detector and to the photoreceptor body to be irradiated. A beam whose intensity is suitable to the scanning density can be irradiated to the image recording section, while a beam whose intensity is suitable to the light-receiving means can be irradiated to the beam detector. Therefore, the laser scanner of the invention can provide a high recording quality unaffected by such noise as electrostatic noise and power supply noise. In addition, a plurality of image information output units, each having a different scanning density, can be connected to the laser beam printer concurrently, and images from these image information output units are arbitrarily combined to produce a desired recorded sheet.

What is claimed is:

1. An image recording apparatus comprising:
   a light source for outputting a beam;
   deflection means for deflecting the beam in predetermined directions to scan a scanning surface;
   beam detection means for receiving the beam deflected by said deflection means to set a reference timing every scanning operation; and
   beam intensity switching means for controlling said light source to switch an intensity of the beam irradiated to said beam detection means and an intensity of the beam scanned on the scanning surface by a plurality-of degrees.

2. The image recording apparatus according to claim 1, wherein the intensity of the beam irradiated to said beam detection means is greater than the intensity of the beam scanned on the scanning surface.

3. An image recording apparatus comprising:
   a light source for outputting a beam;
   deflection means for deflecting the beam in predetermined directions to scan a scanning surface;
   beam detection means for receiving the beam deflected by said deflection means to set a reference timing every scanning operation;
   beam intensity switching means for controlling said light source to switch an intensity of the beam by a plurality-of degrees; and wherein said light source stops output of the beam after a first predetermined time elapses from the reference timing set by said beam detection means, and restarts output of a beam of which intensity is smaller than that prior to stopping output of the beam after a second predetermined time elapses from the reference timing.

4. The image recording apparatus according to claim 1, further comprising modulation means for modulating the beam outputted from said light source.

5. The image recording apparatus according to claim 1, wherein said light source includes a laser oscillator.

6. The image recording apparatus according to claim 1, wherein said deflection means includes a polygon mirror.

* * * * *